United States Patent [19]

Hoffmann et al.

[11] Patent Number: 4,825,974
[45] Date of Patent: May 2, 1989

[54] ADHESIVE INSULATION SYSTEM

[75] Inventors: Manfred Hoffmann, Nienhof; Johann Tonhauser, Miesbach; Dieter Karg, Niederroth, all of Fed. Rep. of Germany

[73] Assignee: Dr. Alois Stankiewicz GmbH, Fed. Rep. of Germany

[21] Appl. No.: 74,922

[22] Filed: Jul. 17, 1987

[30] Foreign Application Priority Data

Jul. 18, 1986 [DE] Fed. Rep. of Germany ....... 3624427

[51] Int. Cl.$^4$ ............................................. F04B 1/82
[52] U.S. Cl. ................................... 181/290; 181/286; 181/294
[58] Field of Search ............... 181/207, 286, 290, 291, 181/294

[56] References Cited

U.S. PATENT DOCUMENTS

| | | | |
|---|---|---|---|
| 2,819,072 | 1/1958 | Detrie et al. | 181/291 X |
| 3,058,704 | 10/1962 | Bergstedt | 181/291 X |
| 3,919,444 | 11/1975 | Shayman | 181/290 X |
| 3,920,872 | 11/1975 | Ollinger | 181/297 X |
| 4,463,049 | 7/1984 | Koacke | 181/286 X |
| 4,487,794 | 12/1984 | Brown et al. | 181/291 X |
| 4,574,915 | 3/1986 | Gahleu et al. | 181/290 |

FOREIGN PATENT DOCUMENTS 2658379  6/1978  Fed. Rep. of Germany ...... 181/291

*Primary Examiner*—B. R. Fuller
*Attorney, Agent, or Firm*—Scully, Scott, Murphy & Presser

[57] ABSTRACT

The invention relates to an adhesive insulating system (3) that is non-destructively removable, e.g. for repair purposes, for sound insulation of partition walls (1), particularly in motor vehicles. Between the foundation and the overlying layers of the insulating system (3) a layer (2) of a highly under-cross-linked polyurethane material or a special bitumen mixture is applied that has a strong adhesive effect and thus enables a force-locked connection to be made between the foundation (1) and the insulating system (3). To ensure that the desired flexibility is obtained together with unchanged acoustic effectiveness even when a carpet (8) is laid on the insulating system (3) or its heavy layer (6), according to the invention a decoupler (7) of soft elastic, predominantly open-pored material is arranged between the carpet (8) and the heavy layer (6). Surprisingly, along with the desired flexibility, the acoustic effect is further improved.

17 Claims, 2 Drawing Sheets

ADHESIVE INSULATION SYSTEM

TECHNICAL FIELD OF THE INVENTION

The invention relates to an adhesive, non-destructively removable insulation system for sound insulation of partition walls, particularly in motor vehicles.

BRIEF DESCRIPTION OF THE PRIOR ART

German patent application No. P 35 10 932.7-53 corresponding to U.S. patent application, Ser. No. 842,462, filed Mar. 21, 1986, now U.S. Pat. No. 4,735,284 describes how optimum utilization of the acoustic parameters can be achieved with the aid of an adhesive covering, for example in a mass-spring system consisting essentially of foam or fibre wool associated with a flexible heavy layer. Such an arrangement is preferably shaped and made as a moulding, and is used for sound insulation in the front wall area of motor vehicles, particularly of passenger vehicles. By the application of the adhesive insulating system the dampening effect on structure-borne sound of the intrinsically highly dampening foam that is used as a spring is substantially transferred to the sheet metal substrate by the coupling that is thereby effected with the substrate. The dampening effect of such an adhesive insulating system according to the main patent is so great that the structure-borne sound dampening coatings that have hitherto also been applied are at least partly, and usually wholly, superfluous. With the adhesive insulating system according to the main patent the overall acoustic effect, i.e. the auditory comfort, in a vehicle equipped with it is so great that not even impaired when the dampening coatings formerly used, which have usually been melted in, are removed.

However, in vehicle manufacture such an insulating system is usually covered with a carpet, i.e. a carpet is either laminated or glued on to the top of the insulating system, in this case on to the upper side of the heavy layer, facing away from the substrate. This however results in loss of the desired flexibility, and the system becomes relatively hard to bend.

OBJECT OF THE INVENTION

The object of the present invention is thus to improve an adhesive insulating system of the above-mentioned kind so that it remains flexible even when a carpet is laid on it, without harm to its good acoustic properties.

SUMMARY OF THE INVENTION

This object is achieved, according to the invention, by the features characterising claim 1.

Surprisingly, in the structure according to the invention the acoustic properties are not only maintained but, as a general rule, improved.

The features of the sub-claims represent further developments of the invention.

It is pointed out that the average man skilled in the art was aware that flexible arrangements have good acoustic properties, but it has hitherto not been possible to produce an insulating system that is both flexible and also has the desired noise-reducing effect. Only by the inventive combination of an adhesive system according to the main patent, in which a structure-borne sound dampening effect is transferred by means of coupling, with the decoupling according to the present invention, can the long-desired results be obtained. By this means marked improvements over conventional mass-produced motor-vehicle equipment are obtained.

However, it is not only in the generally desired low-frequency range, in which the insulation relates to the effects of the engine arrangement, that acoustic effects are observed: the decoupling also brings about absorption of air-borne sound in the high-frequency region. The high-frequency region is however of considerable importance for the intelligibility of speech (e.g. in conversation). Thus it is found that by means of the combination of the adhesive insulating system with decoupling, according to the invention, not only is the overall noise level in a vehicle reduced, but the intelligibility of speech is also considerably improved.

A further advantage is that no technically insoluble problems are encountered in the production of an adhesive insulating system with decoupling between the carpet and the heavy layer of the insulating system: rather the combination, provided by the invention, of heavy layer, decoupler and carpet can be deep drawn as a whole, and other commonly used additions such as, for example, tread protection coatings, heel protectors or the like can be welded on to the surface of the carpet by high frequency welding processes in the usual way.

Other commonly used additional treatments such as foam backing or the like can also be used with an adhesive insulation system constructed according to the invention, just as before.

With regard to the composition of the adhesive coating material, reference is expressly made to U.S. patent application, Ser. No. 842 462, now U.S. Pat. No. 4,735,284, the disclosure of which is incorporated herein by reference. Specifically, the adhesive coating may be a layer of highly under-crosslinked polyurethane or a highly under-crosslinked mixture of two components.

Furthermore, the general concept of an adhesive, non-destructively removable insulating system for the sound insulation of partition walls, especially of motor vehicles, on which the invention is based, can for example also be realised by using a suitable bitumen mixture. It is seen from the relevant literature and the available brochure material (cf. e.g. "Tables and summaries for the use of Shell bitumen", Deutsche Shell AG, 1986) that bitumen is recommended as a glue-type mass for sound and heat insulating materials. The point of the invention however is not to use glue-type masses, but rather adhesive coatings. Hence a mixture of materials is needed that meets this requirement, having regard above all to cold strength (cold flexibility). Thus if for example the cold strength value were to be too high, the desired dampening effect could not be achieved if such a system were used in a vehicle, since the adhesive coating would separate from the metal sheet substrate at low exterior temperatures, e.g. below the freezing point, and the force-locked adhesive connection needed for the effect according to the invention would no longer be obtained. With a bitumen mixture of the kind set forth in the sub-claims this problem, namely of improving the cold flexibility, is solved by admixture of atactic polypropylene (APP). A measure of the cold flexibility is the Fraas breaking point, which can be found in the relevant Tables.

The best kinds of bitumen available are considered to be so-called distillation bitumen and oxidation bitumen, the latter also being known as "blown" bitumen and having better properties when used as an adhesive coating than, e.g., distillation bitumen because its breaking point is generally lower. The adhesion can be described e.g. by the parameter "penetration" determined according to DIN 1995 as the depth of penetration of a needle acting on the bitumen test piece with a specified force and for a period of 10 seconds. Penetration values of <15 characterise hard types of bitumen, while values of >80 characterise very soft types. For the purpose envisaged, penetration values in the range between about 15 and 55 have been found suitable. On account of the frequently great spatial deformation of the surface of the sound insulating parts for which an adhesive coating is provided, handling of the APP-bitumen mixture by means of a spraying device has much to recommend it. For this purpose it is further necessary to determine the proportion of APP to bitumen in the mixture that provides suitable application properties as well as having the adhesive effect that is important in the invention. The spraying device needed must withstand heating to about 220° C. so that the liquefied material can be applied to the surface to be coated in a finely divided state under the spray pressure.

Ti has been found that proportions of APP to bitumen in the mixture of from 1:1 to 1:2 cannot be used with such a spraying device. Likewise the APP-bitumen mixture of about 1:4 has been found to be very sticky, so that this would not solve the problem. In contrast to this, an APP-bitumen mixture in the ratio of about 1:3 has been found suitable.

An example of a suitable mixture is that of the oxidation bitumen Mexphalt R 85/25 with atactic polypropylene Hoechst APP CR, characterised by the properties: melt viscosity at 180° C.>50,000 mPa.s and penetration value 35-55.

Fillers are also added to the mixture for fine control of the adhesive properties. For this purpose the inorganic materials known to those skilled in the art are suitable. In addition, additives can be added, e.g. antioxidants to prevent embrittlement of the mixture. According to the state of the art, processing aids such as wax are also added.

BRIEF DESCRIPTION OF THE DRAWINGS

Embodiments of the invention are shown diagrammatically by way of example in the drawings, in which.

DETAILED DESCRIPTION OF PREFERRED EMBODIMENTS OF THE INVENTION

Figure 1:
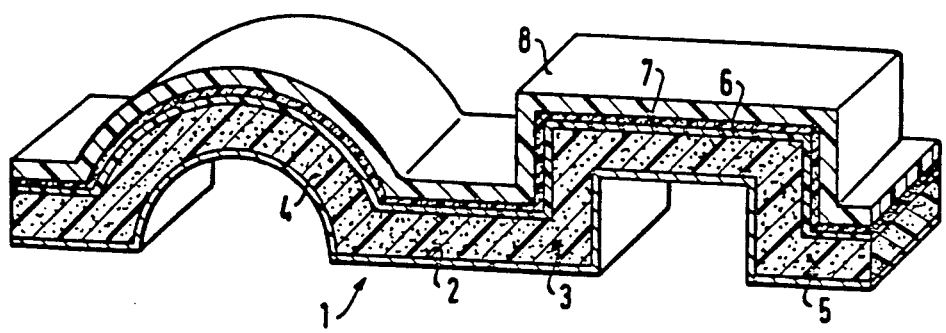
FIGS. 1, 2 and 3 show different forms of a wall part made up of a contoured metal sheet on which a sound dampening adhesive insulating system is applied as a wall covering, with a carpet laid thereon over a decoupler.
Figure 2:
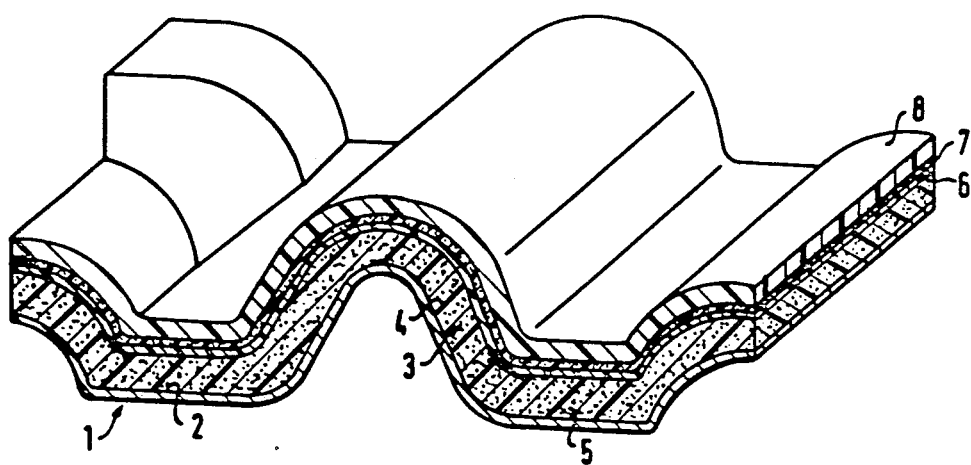
Figure 3:
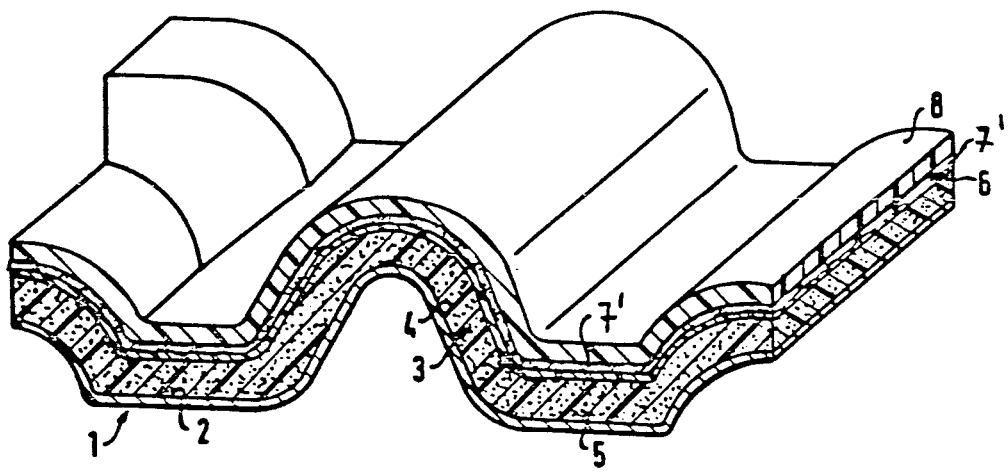

The metal sheet forming the foundation of the wall part 1 exhibits contours that are followed by the wall covering, which is formed as a moulding and comprises an insulating system 3 with a carpet 8 laid on top of it, the thickness of the wall covering being kept constant. The wall covering is stuck to the wall part 1 without the use of glue, by means of an adhesive coating 2 according to German patent application No. P 35 10 932.7-53 corresponding to U.S. patent application Ser. No. 842 462, filed Mar. 21, 1986, now U.S. Pat. No. 4,735,284.

The wall covering consists of an insulating system of the kind depicted in U.S. Pat. No. 4,735,284 which again, as is known per se, consists of a so-called spring 4, 5 of foam, fibre wool or the like and a mass 6 of a filled synthetic material forming a heavy layer. According to U.S. Pat. No. 4,735,284 locally varied sound dampening capacity is achieved by means of an adhesive coating 2 applied over part of the surface of the spring 4, 5. If desired, uniform sound dampening capacity can be achieved over the whole of the surface by a corresponding adhesive coating 2 applied over the whole surface of the spring 4, 5.

The adhesion of the coating material of the spring 4, 5 or of the spring 4, 5 itself can be changed practically continuously in the production of the insulating system 3 by corresponding control of the proportion of the cross-linking agent in the mixture. Thus in the case of substantially constant thickness and locally varied sound insulating ability all that is need is a single simple process, in which stiffening coatings can also be applied if desired.

According to the invention the wall covering is now provided, between the heavy layer 6 of the insulating system and the carpet 8 laid thereon, with a decoupler 7 consisting of a soft elastic, predominantly open-pored material, preferably a foam or a fibre wool or felt having a similar acoustic effect. This decoupler 7 is applied as a thin layer with a thickness in the region of about 5 mm. The effect of the decoupler 7 provided according to the invention is to obviate the reduction in flexibility that is otherwise observed on applying a carpet to the insulation system, and it is surprisingly found in addition that not only is the acoustic effectiveness retained, but as a rule it is even improved. Moreover such an arrangement can be simply shaped in conventional ways.

What is claimed is:

1. An adhesive, non-destructively removable insulation system for sound insulation of partition walls comprising an adhesive coating disposed between a partition wall and a spring having sound dampening properties, said adhesive coating providing releasable adherence of said spring to said partition wall, and an acoustic decoupling layer, disposed above said spring, providing acoustical decoupling between said insulation system and a covering disposed over said decoupling layer.

2. An insulation system in accordance with claim 1 wherein said covering, disposed over said insulation system, is a carpet.

3. An insulation system in accordance with claim 1 wherein said adhesive coating is selected from the group consisting of a layer of highly under-crosslinked polyurethane and a sprayed layer of a highly under-crosslinked mixture of two components.

4. An insulation system in accordance with claim 3 wherein said adhesive coating is a layer of highly under-crosslinked polyurethane.

5. An insulation system in accordance with claim 3 wherein said adhesive coating is a sprayed layer of a highly under-crosslinked mixture of two components.

6. An insulation system in accordance with claim 5 wherein said components of said under-crosslinked mixture of two components are bitumen and atactic polypropylene.

7. An insulation system in accordance with claim 6 wherein said mixture of bitumen and atactic polypropylene is present in a concentration such that the ratio of bitumen to atactic polypropylene is about 3:1.

8. An insulation system in accordance with claim 6 wherein said bitumen is oxidation bitumen.

9. An insulation system in accordance with claim 1 wherein said acoustic decoupling layer is a soft elastic, predominantly open-pored material.

10. An insulation system in accordance with claim 9 wherein said acoustic decoupling layer is selected from the group consisting of a foam, a fibre wool and a felt.

11. An insulation system in accordance with claim 9 wherein said acoustic decoupling layer has a thickness of about 5 mm.

12. An insulation system in accordance with claim 1 including a heavy layer disposed above said spring and below said acoustic decoupling layer.

13. An insulation system in accordance with claim 12 wherein said heavy layer is a filled synthetic layer.

14. An insulation system in accordance with claim 1 wherein said spring is selected from the group consisting of a foam and a fibre wool.

15. An insulation system in accordance with claim 3 wherein said acoustic coating is provided with a stiff covering selected from the group consisting of cardboard, kraft paper and spray hardenable plastics.

16. An insulation system in accordance with claim 5 wherein said highly under-crosslinked mixture of two components has a melt viscosity at 180° C. of greater than 50,000 mPa and a penetration value, measured in accordance with DIN 1995, of between 15 and 55.

17. An insulation system in accordance with claim 16 wherein said penetration value, measured in accordance with DIN 1995, is in the range of between 35 and 55.

* * * * *